(12) United States Patent
Nagashima et al.

(10) Patent No.: US 9,487,207 B2
(45) Date of Patent: Nov. 8, 2016

(54) TORQUE COMPENSATION METHOD AND SYSTEM

(71) Applicant: Honda Motor Co., Ltd., Tokyo, Minato-ku (JP)

(72) Inventors: Dan Nagashima, Dublin, OH (US); Takahide Mizuno, Dublin, OH (US); Hirokazu Toyoshima, Dublin, OH (US); Lee O'Donnell, Burnaby (CA); Naomichi Tonokura, Dublin, OH (US); Akio Muto, Utsunomiya (JP); Yutaka Ishikawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 562 days.

(21) Appl. No.: 14/157,580

(22) Filed: Jan. 17, 2014

(65) Prior Publication Data
US 2014/0195130 A1    Jul. 10, 2014

Related U.S. Application Data

(62) Division of application No. 12/775,016, filed on May 6, 2010, now Pat. No. 8,640,838.

(51) Int. Cl.
*B60W 10/119* (2012.01)
*B60W 10/06* (2006.01)
(Continued)

(52) U.S. Cl.
CPC ............ *B60W 10/119* (2013.01); *B60K 28/16* (2013.01); *B60W 10/06* (2013.01); *F02D 37/02* (2013.01);
(Continued)

(58) Field of Classification Search
CPC ... B60W 10/119; B60W 10/06; F16H 45/00; F16H 63/50; F16H 2059/467; F16H 59/72; B60K 28/16; F02D 41/0215; F02D 41/1497; F02D 37/02; F02D 2400/12; F02D 2200/021; F02D 2250/18; F02D 29/04
See application file for complete search history.

(56) References Cited

U.S. PATENT DOCUMENTS 3,871,341 A    3/1975 Kalogerson et al.
3,939,948 A    2/1976 Kalogerson et al.
(Continued)

FOREIGN PATENT DOCUMENTS

EP    532364    3/1993
JP    62074726    4/1977
(Continued)

OTHER PUBLICATIONS

International Search Report and Written Opinion mailed Oct. 14, 2011 in International Application No. PCT/US2011/034916.
(Continued)

*Primary Examiner* — H Rojas
(74) *Attorney, Agent, or Firm* — Kenealy Vaidya LLP

(57) ABSTRACT

A system and method of compensating for torque converter slip in a motor vehicle include measuring rotational speeds of an engine crankshaft and mainshaft, as well as measuring operating temperatures of a fluid associated with the motor vehicle. Engine output torque is adjusted as required by controlling some combination of ignition timing, intake air flow, fuel injection, and accessory load. A system and method for deactivating a torque compensation system retrieves a number of times the torque compensation system has been activated over a set period. If the number exceeds a predetermined number of activations, the torque compensation system is deactivated.

20 Claims, 9 Drawing Sheets

(51) Int. Cl.

| | | |
|---|---|---|
| F16H 45/00 | (2006.01) | |
| B60K 28/16 | (2006.01) | |
| F02D 41/02 | (2006.01) | |
| F02D 41/14 | (2006.01) | |
| F16H 63/50 | (2006.01) | |
| F02D 37/02 | (2006.01) | |
| F16H 59/46 | (2006.01) | |
| F16H 59/72 | (2006.01) | |
| F02D 29/04 | (2006.01) | |

(52) U.S. Cl.
CPC ....... *F02D 41/0215* (2013.01); *F02D 41/1497* (2013.01); *F16H 45/00* (2013.01); *F16H 63/50* (2013.01); *F02D 29/04* (2013.01); *F02D 2200/021* (2013.01); *F02D 2250/18* (2013.01); *F02D 2400/12* (2013.01); *F16H 59/72* (2013.01); *F16H 2059/467* (2013.01)

(56) References Cited

U.S. PATENT DOCUMENTS

| | | | |
|---|---|---|---|
| 4,166,440 A | 9/1979 | Helava et al. | |
| 4,166,442 A | 9/1979 | Henderson et al. | |
| 4,733,581 A | 3/1988 | Hasegawa et al. | |
| 5,166,681 A | 11/1992 | Bottesch et al. | |
| 5,301,764 A | 4/1994 | Gardner | |
| 5,319,963 A | 6/1994 | Benford | |
| 5,337,630 A | 8/1994 | Sakai et al. | |
| 5,346,031 A | 9/1994 | Gardner | |
| 5,611,754 A | 3/1997 | Haga et al. | |
| 5,633,796 A | 5/1997 | Cullen et al. | |
| 5,646,851 A | 7/1997 | O'Connell et al. | |
| 5,835,877 A | 11/1998 | Unuvar et al. | |
| 5,855,533 A | 1/1999 | Tolkacz et al. | |
| 5,868,214 A | 2/1999 | Workman | |
| 5,924,508 A | 7/1999 | Clauss et al. | |
| 6,002,979 A | 12/1999 | Ishizu | |
| 6,078,859 A | 6/2000 | Jastrzebski et al. | |
| 6,390,055 B1 | 5/2002 | Sivashankar et al. | |
| 6,560,523 B2 | 5/2003 | Kotwicki et al. | |
| 6,584,952 B1 | 7/2003 | Lagier | |
| 6,675,088 B2 | 1/2004 | Miki | |
| 6,845,753 B2 | 1/2005 | Kotwicki | |
| 6,902,512 B2 | 6/2005 | Kamichi et al. | |
| 7,124,027 B1 | 10/2006 | Ernst, Jr. et al. | |
| 7,204,230 B2 | 4/2007 | Bevan et al. | |
| 7,254,472 B2 | 8/2007 | Larsen et al. | |
| 7,290,627 B1 | 11/2007 | Gardner | |
| 7,337,055 B2 | 2/2008 | Matsumoto et al. | |
| 7,493,756 B2 | 2/2009 | Mizuno et al. | |
| 8,640,838 B2 | 2/2014 | Nagashima et al. | |
| 2006/0095195 A1 | 5/2006 | Nishimura et al. | |
| 2006/0293146 A1 | 12/2006 | Nakayashiki et al. | |
| 2007/0032340 A1 | 2/2007 | Hrovat et al. | |
| 2008/0041648 A1 | 2/2008 | Gardner | |
| 2008/0287254 A1 | 11/2008 | Nagai | |
| 2008/0306669 A1 | 12/2008 | Wang et al. | |
| 2009/0037047 A1 | 2/2009 | Hawkins et al. | |
| 2009/0111655 A1 | 4/2009 | Hatanaka | |
| 2009/0294194 A1 | 12/2009 | Kitano et al. | |
| 2010/0170740 A1 | 7/2010 | Lochocki, Jr. et al. | |
| 2011/0276239 A1 | 11/2011 | Nagashima et al. | |

FOREIGN PATENT DOCUMENTS

| | | |
|---|---|---|
| JP | 55146270 | 11/1980 |
| JP | 59187147 | 10/1984 |
| JP | 62056655 | 3/1987 |
| JP | 62149525 | 7/1987 |
| JP | 62184936 | 8/1987 |
| JP | 63071545 | 3/1988 |
| JP | 63145853 | 6/1988 |
| JP | 2037155 | 2/1990 |
| JP | 04171355 | 2/1990 |
| JP | 02097762 | 4/1990 |
| JP | 02217660 | 8/1990 |
| JP | 04143438 | 5/1992 |
| JP | 05060216 | 3/1993 |
| JP | 5196123 | 8/1993 |

OTHER PUBLICATIONS

International Preliminary Report on Patentability (including Written Opinion of the ISA) mailed Nov. 15, 2012, in International Application No. PCT/US2011/034916.

$$q_c = (T_h - T_c) C_L E$$

$T_h - T_c$ = TEMPERATURE DIFFERENCE BETWEEN HOT AND COLD FLUIDS ENTERING A HEAT EXCHANGER
$C_L$ = HEAT CAPACITY FLOW RATE
$E$ = EFFECTIVENESS OF HEAT EXCHANGER

FIG. 9

$$T_o = T_o(i-1) + \frac{(q_{TC} + q_T - q_C - q_X) \Delta t}{3600\, M_{TH}}$$

$T_o(i-1)$ = PREVIOUSLY PREDICTED TRANSMISSION OIL TEMPERATURE
$q_{TC}$ = HEAT FLOW OF THE TORQUE CONVERTER
$q_T$ = TRANSMISSION HEAT FLOW
$q_c$ = TRANSMISSION COOLER HEAT FLOW
$q_X$ = EXTERIOR OF TRANSMISSION HEAT FLOW
$\Delta t$ = CALCULATION TIME INTERVAL IN SECONDS
$M_{TH}$ = THERMAL INERTIA

FIG. 10

TORQUE COMPENSATION METHOD AND SYSTEM

CROSS REFERENCE TO RELATED APPLICATION

This application is a division of U.S. Pat. No. 8,640,838, currently U.S. application Ser. No. 12/775,016, entitled "Torque Compensation Method and System", filed on May 6, 2010 and allowed on Sep. 30, 2013, the disclosure of which application is incorporated herein by reference in its entirety.

BACKGROUND

1. Field of the Invention

The present invention relates to motor vehicles, and in particular, to a torque compensation method or system for engine idle torque control.

2. Description of Related Art

Automatic transmissions are a source of parasitic torque loss to a motor vehicle engine. To provide adequate compensating torque, properties of the engine must be accurately predicted or engine speed will drop or even stall.

At colder temperatures, the viscosity of fluids in a torque converter or transmission may increase, which may increase friction. At colder temperatures, a torque converter or transmission clutch may also have a tendency to lock in neutral as a result of the higher viscosity. When a torque converter locks, it is impossible for the torque converter to convert input from high rotational speed and low torque to an output of low rotational speed and high torque that is needed to start a motor vehicle moving. There is a need in the art for a method that determines additional torque required from an engine when motor vehicles are subjected to low temperatures.

SUMMARY

The invention provides a torque compensation method and system for engine torque control for a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, sport utility vehicles, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems that convert kinetic energy from a drive train into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of compensating for drive train slip in a motor vehicle, comprising the steps of: receiving information related to the rotational speed of a first shaft and the rotational speed of a second shaft, the first shaft and the second shaft being hydraulically coupled, with the first shaft providing input torque and the second shaft providing output torque, and the first shaft and second shaft being part of a drive train of the motor vehicle; receiving information related to a vehicle fluid temperature; computing a slip ratio while the engine is idling, the slip ratio being the ratio of second shaft rotational speed to first shaft rotational speed; comparing the slip ratio to an expected slip ratio corresponding to the vehicle fluid temperature, the expected slip ratio being stored in a database; and providing a signal to an engine to increase torque output if the slip ratio is above the expected slip ratio corresponding to the vehicle fluid temperature.

In another aspect, the invention provides a system for adjusting the output torque of an engine for a motor vehicle, comprising: an electronic control unit; a sensor for detecting a rotational speed of a first shaft in a drive train of the motor vehicle, the first shaft being an input; a sensor for detecting a rotational speed of a second shaft in the drive train of the motor vehicle, the second shaft of the motor vehicle being an output shaft hydraulically coupled to the first shaft; and a sensor for determining a temperature of a vehicle fluid, wherein the electronic control unit is configured to use input from the sensor for the first shaft, input from the sensor for the second shaft, and input from the sensor for determining temperature of a vehicle fluid to determine whether a slip between the first shaft and the second shaft exceed an expected value corresponding to the vehicle fluid temperature.

In another aspect, the invention provides a method for maintaining the output torque of an engine for a motor vehicle, comprising the steps of: determining an actual slip ratio, the actual slip ratio being defined as a ratio of an actual rotational speed of an output shaft in the drive train of the motor vehicle to an actual rotational speed of an input shaft in the drive train of the motor vehicle, the output shaft and the input shaft being hydraulically coupled to each other; determining the temperature of a fluid associated with the motor vehicle; comparing the actual slip ratio to an expected slip ratio corresponding to the temperature of the fluid associated with the motor vehicle; and varying operation of the engine of the motor vehicle to maintain a predetermined output torque of the engine of the motor vehicle.

Other systems, methods, features, and advantages of the invention will be, or will become, apparent to one of ordinary skill in the art upon examination of the following figures and detailed description. It is intended that all such additional systems, methods, features, and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 9 is an embodiment of a formula for calculating heat flow in a transmission cooler; and FIG. 10 is an embodiment of a formula for calculating temperature of automatic transmission fluid.

DETAILED DESCRIPTION

Figure 1:
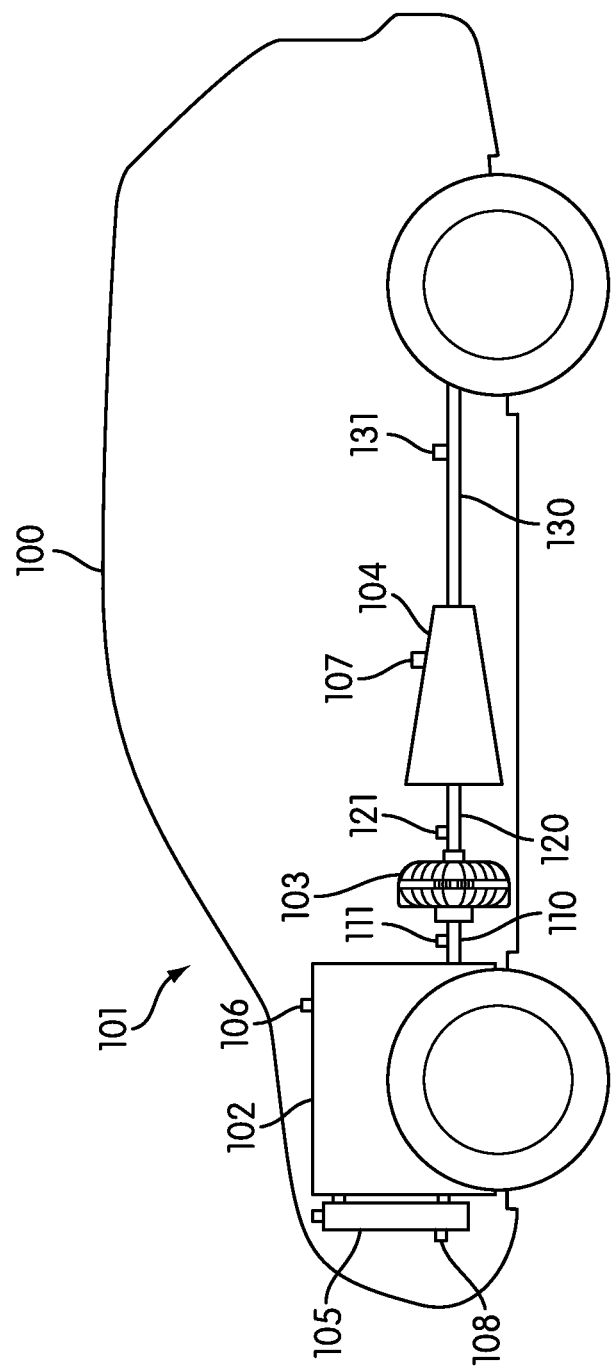
FIG. 1 is a schematic view of an embodiment of a motor vehicle including a torque compensation system for engine torque control.

FIG. 1 is a schematic diagram of an embodiment of a portion of a motor vehicle 100. For purposes of illustration, motor vehicle 100 is shown as a sports utility vehicle; however it should be understood that in other embodiments the motor vehicle 100 could be any type of motor vehicle including, but not limited to: car, truck, van, minivan, sport utility vehicle, motorcycle, scooter, boat, personal watercraft, and aircraft.

FIG. 1 shows vehicle 100 as a rear wheel drive vehicle with a transmission. Transmission, as used in this specification, includes transaxles. The present invention may not only be used with rear wheel drive vehicles, but may also be used with four-wheel drive and all-wheel drive vehicles, and rear engine/rear wheel drive vehicles using a transaxle.

Motor vehicle 100 may include an engine 102. Engine 102 may be any type of engine that is capable of producing torque. Engine 102 may be electrical or engine 102 may be an internal combustion engine. If engine 102 is an internal combustion engine, engine 102 may be a piston engine including any number of cylinders or it may be a rotary engine. In some embodiments, motor vehicle 100 and engine 102 may be further associated with a power train system as well as other components necessary for a motor vehicle to operate. For clarity, only some components of motor vehicle 100 are shown in this schematic illustration.

In some embodiments, motor vehicle 100 may include provisions for compensating for torque losses in a power train system. Power train, as used in this specification, refers to the group of components that generate power and deliver it to the road surface, water, or air. This may include the engine, torque converter, transmission, driveshafts (for example, a crankshaft), differentials, and the final drive (For example, drive wheels, continuous track, propeller, ship's screw, and so forth).

FIG. 1 shows that components of the drive train may include the engine 102, a torque converter 103, a transmission 104, a radiator 105, a crankshaft 110, a mainshaft 120, and an output shaft 130. An engine oil temperature sensor 106 may in some embodiments sense, directly or indirectly, a temperature of engine oil in engine 102. A transmission fluid temperature sensor 107 may in some embodiments sense, directly or indirectly, the temperature of the automatic transmission fluid in transmission 104. An engine coolant temperature sensor 108 may in some embodiments sense, directly or indirectly, the temperature of coolant in radiator 105. Any or all temperatures and rotational speeds may be computed rather than measured.

The engine oil temperature sensor 106, transmission fluid temperature sensor 107, and engine coolant temperature sensor 108 may preferably be thermistors, but may also be thermocouples, resistance temperature detectors, or any other temperature measuring technology known in the art that is appropriate for sensing vehicle fluid operating temperatures. As used in this specification, the term "vehicle fluid temperature" may refer to the temperature of any fluid associated with a vehicle, including but not limited to engine oil temperature, transmission fluid temperature, engine coolant temperature, differential fluid temperature, or power steering fluid temperature.

A driveshaft speed sensor 111 may sense the rotational speed of the crankshaft 110. A mainshaft speed sensor 121 and an ouput shaft speed sensor 131 may, respectively, sense the rotational speed of the mainshaft 120 and the output shaft 130.

The speed sensors 111, 121, and 131 may use any method known in the art and practical for use in motor vehicles for measuring rotational speed including, but not limited to, centrifugal force, Hall effect sensors, or stroboscopes and photodiodes. Engine speed sensor 111 may in some embodiments be configured to measure a current engine speed. Engine speed sensor 111 may in some embodiments be disposed within engine 102. In some embodiments, engine speed sensor 111 may be a crank angle sensor that may be associated with a crankshaft 110 of engine 102. Mainshaft speed sensor 121 may be associated with mainshaft 120 of engine 102 and output shaft speed sensor 131 may be associated with output shaft 130.

Figure 2:
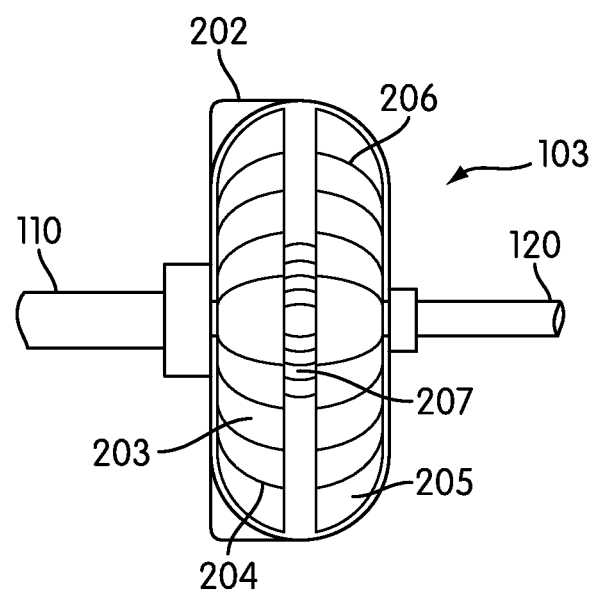
FIG. 2 is a cutaway view of an embodiment of a torque converter.

FIG. 2 shows a cutaway view of an example of a torque converter 103. In a typical motor vehicle automatic transmission, the engine 102 drives the crankshaft 110. The end of crankshaft 110 opposite engine 102 may go through the front of a housing 202 of torque converter 103 to provide an input to the torque converter 103. The output of torque converter 103 may be mainshaft 120, which may provide an input to transmission 104.

A pump impeller 203 may be attached to the crankshaft 110 inside housing 202 of converter 103 and may include fins 204. Pump impeller 203 may act as a centrifugal pump. As pump impeller 203 spins, fluid may be driven to the periphery of torque converter 103, creating a vacuum that draws more fluid into the center of pump impeller 203.

Mainshaft 120 may be attached to a turbine runner 205 within torque converter 103 having fins 206. The fluid driven to the outside wall of torque converter 103 may enter the fins 206 of turbine runner 205, causing turbine runner 205, and hence mainshaft 120, to spin. Thus, torque converter 103 may provide a "hydraulic coupling" between crankshaft 110 and mainshaft 120. A "hydraulic coupling" may be defined in this specification as a device that links two rotatable shafts, with one shaft attached to a vaned impeller and the other shaft attached to a similarly vaned runner, with both impeller and runner enclosed in a casing containing a liquid. The turning impeller transfers torque to the runner, causing it to turn.

Torque converter 103 may also have a stator 207. Stator 207 may improve fluid flow between pump impeller 203 and turbine runner 205, reducing power consumption.

Torque converter 103 may operate as follows. As engine 102 is accelerated from motor vehicle 100 being at a stop, the rotational speed of pump impeller 203, which is attached to crankshaft 110 may increase. The increase in rotational speed of pump impeller 203 may result in fluid from pump impeller 203 being thrown to the outer wall of torque converter 103. Fluid thrown to the outer wall of torque converter 103 may flow into turbine runner 205, which is attached to mainshaft 120 with increasing force as the speed of pump impeller 203 increases. This may create a vortex of fluid flow that results in more torque being applied to turbine 205, causing mainshaft 120 to rotate faster as crankshaft 110 rotates faster. U.S. Pat. No. 7,493,756 provides a description of typical torque converter operation and is incorporated herein by reference.

As the speed of motor vehicle 100 stabilizes, crankshaft 110 may rotate only slightly faster than mainshaft 120. The ratio of the rotational speed of mainshaft 120 to the rotational speed of crankshaft 110, as explained above, may be referred to broadly as drive train slip ratio, or more narrowly as torque converter slip ratio. The term "drive train slip ratio" may include slip in other parts of the drive train and not just in the torque converter and is the ratio of an output shaft rotational speed to an input rotational speed for a particular hydraulically coupled drive train device. The description below of operation of a torque compensation system as a function of torque converter slip applies to any other drive train device in which slip occurs.

If torque converter slip ratio is less than 100%, the crankshaft 110 may be rotating faster than mainshaft 120. If torque converter slip is equal to 100%, the engine crankshaft 110 may be rotating at the same speed as mainshaft 120. If torque converter slip ratio is greater than 100%, engine crankshaft 110 may be rotating slower than mainshaft 120 because engine 102 may be being driven by transmission 104.

In this embodiment, motor vehicle 100 may include a torque compensation system 101. Torque compensation system 101 may be associated with an electronic control unit or an on-board computer of motor vehicle 100. In some embodiments, torque compensation system 101 may be a subsystem of an electronic control unit. For example, in some embodiments, torque compensation system 101 could be a software program installed within an electronic control unit that is configured to control all the systems and devices associated with motor vehicle 100. In other embodiments, torque compensation system 101 may be a stand-alone system that may or may not communicate with an electronic control unit.

Figure 3:
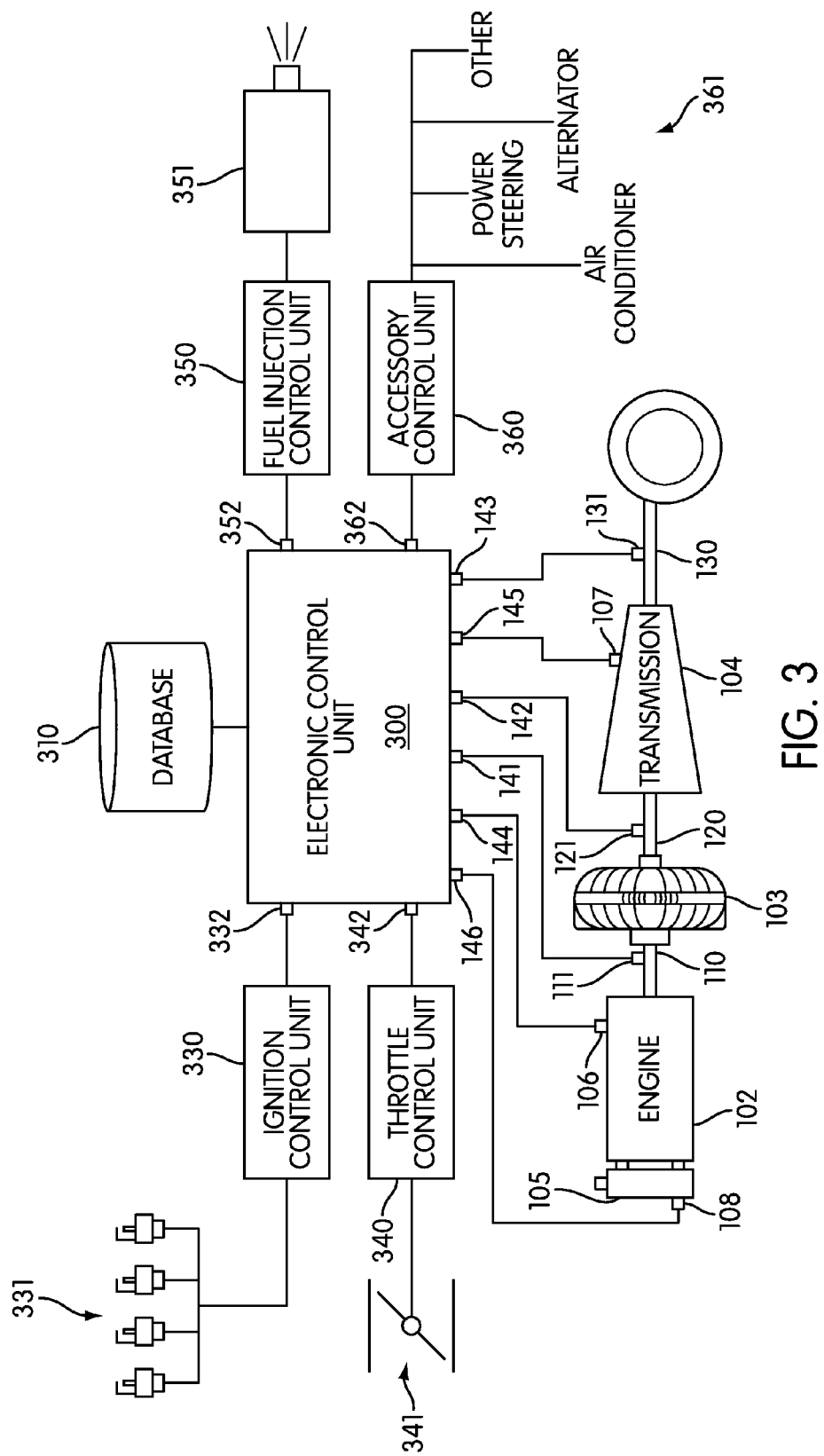
FIG. 3 is a schematic view of an embodiment of a torque compensation system for engine torque control.

FIG. 3 is an embodiment of torque compensation system 101. Electronic control unit 300 can include a number of ports that facilitate the input and output of information and power. All of the following ports and provisions associated with electronic control unit 300 are optional. Some embodiments may include a given port for a sensor or controlled device, while others may exclude it. The following description discloses many of the possible parts and provisions that can be used. However, it should be kept in mind that not every part or provision must be used in a given embodiment.

The term "port" means any interface or shared boundary between two conductors or a wireless connection. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

Electronic control unit 300 of torque compensation system 101 is in some embodiments in communication with various components of motor vehicle 100. In this embodiment, electronic control unit 300 may be in communication with crankshaft speed sensor 111 via a first port 141, mainshaft speed sensor 121 via a second port 142, output shaft speed sensor 131 via a third port 143, engine oil temperature sensor 106 via a fourth port 144, transmission fluid temperature sensor 107 via a fifth port 145, and engine coolant temperature 108 via a sixth port 146. In other embodiments, one or more of the crankshaft speed sensor 111, mainshaft speed sensor 121, output shaft speed sensor 131, engine oil temperature sensor 106, transmission fluid temperature sensor 107, and engine coolant temperature sensor 108 may not be present in torque compensation system 101. Generally, ports 141-146 may be any type of connections, including both wired and wireless connections.

Typically, torque compensation systems adjust various operating parameters within a motor vehicle to compensate for torque lost in drive train components such as torque converters. These torque losses may become higher than normal on occasion for reasons such as low ambient temperature. In many cases, torque compensation systems may adjust parameters such as ignition timing, throttle valve opening, fuel injection parameters, and operation of accessories to compensate for torque losses.

A database 310 may store information related to characteristics of engine oil, transmission fluid, engine coolant, and other drive train fluids. Database 310 may also store information related to torque compensation procedures. Database 310 may be stored on a magnetic disk, an optical disk, a solid state drive, flash memory data storage device, or any other satisfactory means of data storage known in the art.

The electronic control unit 300 may calculate torque converter slip ratio using information input to electronic control unit 300 by crankshaft speed sensor 111 via port 141 and mainshaft speed sensor 121 via port 142. Engine oil temperature sensor 106, transmission fluid temperature sensor 107, and/or engine coolant temperature sensor 108 may also provide input to electronic control unit 300 via ports 144, 145, and/or 146, respectively. Torque converter slip ratio may be compared to a curve explained below from database 310. If the torque converter slip ratio exceeds a threshold value for the temperature(s) sensed by engine oil temperature sensor 106, transmission fluid temperature sensor 107, and/or engine coolant temperature sensor 108, electronic control unit 300 may provide a signal to increase output torque of engine 102.

Output torque of engine 102 may be increased in several ways. A signal may be provided from electronic control unit 300 through a port 332 to an ignition control unit 330 to adjust ignition timing of an ignition system 331 to increase torque. A signal may be provided from electronic control unit 300 through a port 342 to an intake air control unit 340 to adjust an air intake valve 341 or to bypass air intake valve 341 to increase torque.

A signal from electronic control unit 300 through a port 352 to a fuel injection control unit 350 to adjust a fuel injection system 351 may lead to one or more of several changes to operation of fuel injection system 351. For example, injection timing, injection pressure, and/or injection open time can be adjusted.

An accessory load control unit 360, in response to a signal from electronic control unit 300 through a port 362, may reduce accessory load for accessories 361 by one or more of: decreasing alternator field, decoupling the alternator, decoupling a power steering pump, or reducing power steering pump pressure. Load to other accessories may also be adjusted by a signal from electronic control unit 300 to accessory load control unit 360.

The means of controlling engine torque are not limited to those described above, but may include any means of controlling engine torque known in the art.

Figure 4:
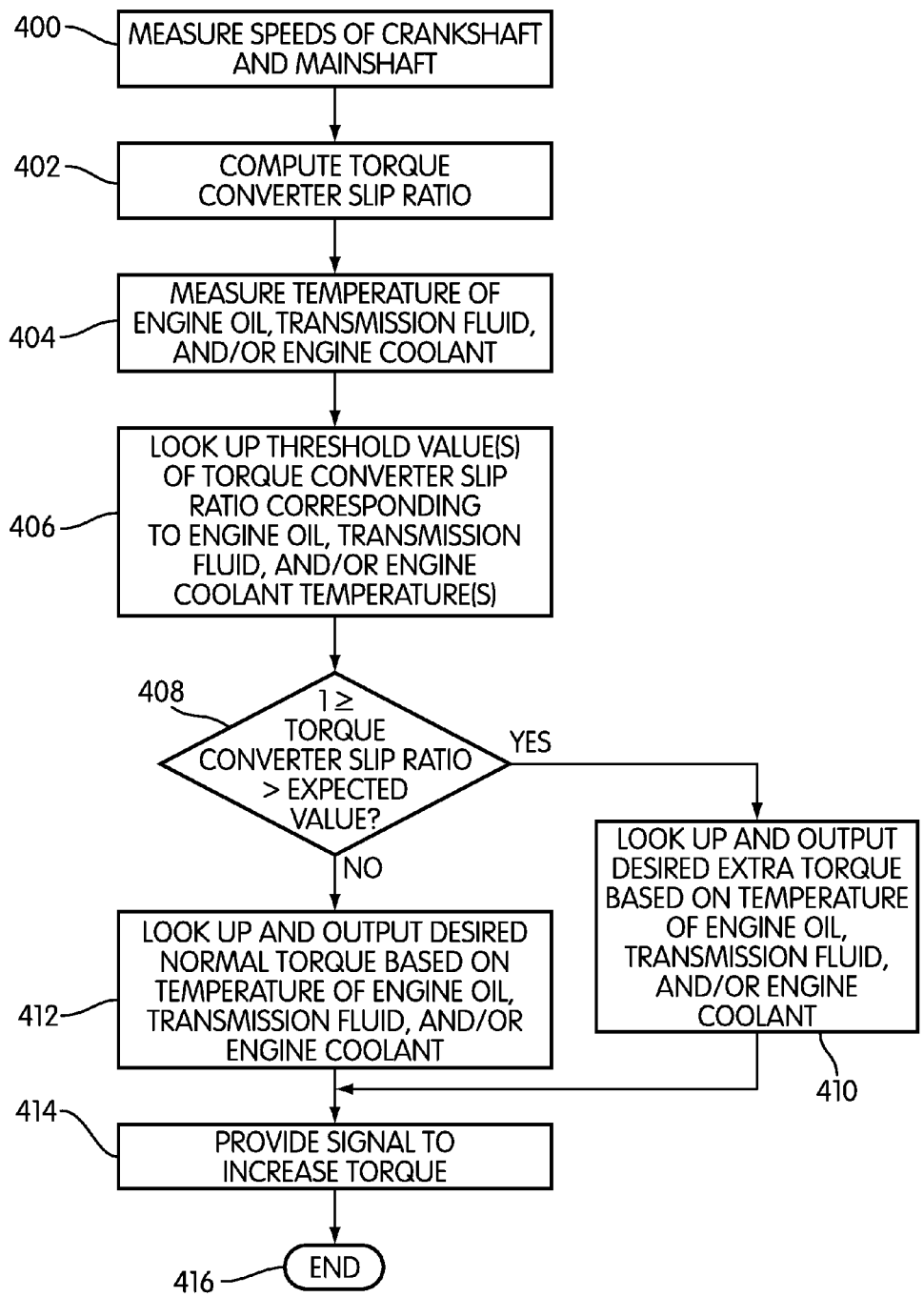
FIG. 4 is a flow chart for operation of an embodiment of a torque compensation system for engine torque control.

FIG. 4 is a flowchart depicting an embodiment of the process of adjusting torque as required based on the torque converter slip ratio exceeding a threshold value. In step 400, the speeds of crankshaft 110 and mainshaft 120 may be determined.

In step 402, electronic control unit 300 may calculate the torque converter slip ratio. In some embodiments, the speed of crankshaft 110 and mainshaft 120 may be determined for calculating the torque converter slip ratio while the engine 102 of motor vehicle 100 is idling. In other embodiments, the torque converter slip ratio may be determined while motor vehicle 100 is moving.

Step 404 may involve inputting of engine oil temperature from engine oil temperature sensor 106 through port 144, transmission fluid temperature from transmission fluid temperature 107 through port 145, and/or engine coolant temperature from engine coolant temperature sensor 108 through port 146 to electronic control unit 300.

Figure 5:
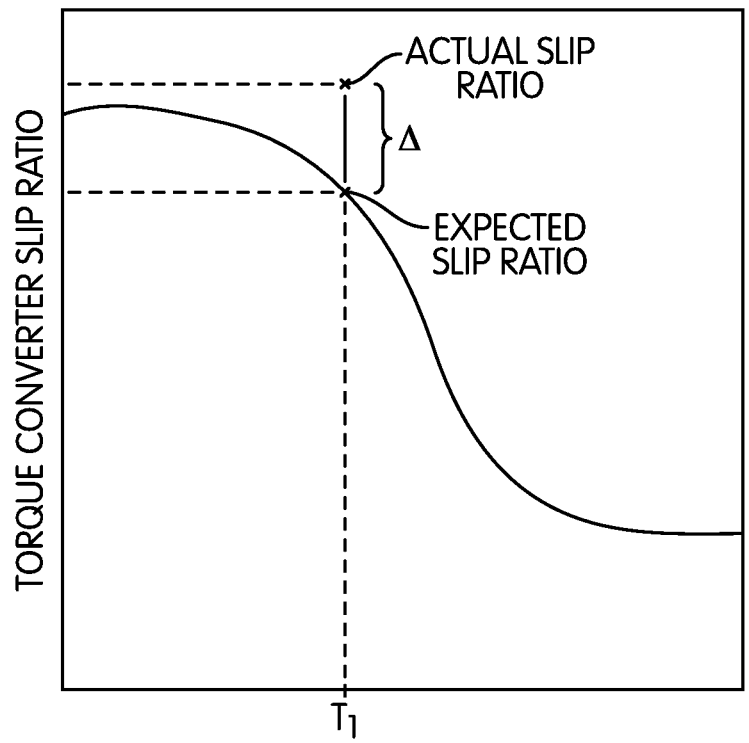
FIG. 5 is a diagram showing expected slip ratios versus fluid temperatures for an embodiment of a torque compensation system.

FIG. 5 shows a graph and table including expected slip ratio values versus fluid temperatures for a vehicle including a torque compensation system according to an embodiment of the invention. The expected slip ratio values may correspond to the measured temperatures from engine oil temperature sensor 106, transmission fluid temperature sensor 107, and/or engine coolant temperature sensor 108. The expected slip ratio values may correspond to some combination of those temperatures or to one or more simulated temperatures of the same vehicle fluids. Electronic control unit 300 may use the temperature information to look up expected values of torque converter slip ratio from a curve or table located in database 310 in step 406.

While the distribution of expected drive train slip ratios for given engine oil and/or transmission fluid temperatures may be most readily conceived of as a continuous curve, in a digital device the information may be stored as a look-up table in which discrete intervals of temperatures correspond to values of expected slip ratios. Such a table is shown in FIG. 5, where $T_n$ represents a temperature and $ESR_n$ represents the expected slip ratio corresponding to that temperature.

Torque compensation system 101 may use a graph as shown in FIG. 5 in which the only factors are the temperature and whether the actual slip ratio exceeds the expected slip ratio. A required torque, shown as $RT_n$ in the table show in FIG. 5 would be associated with that temperature for any actual slip ratio exceeding the expected slip ratio $ESR_n$.

In step 408, electronic control unit 300 may determine whether torque converter slip ratio is less than one and exceeds the expected value determined in step 406. If torque converter slip ratio exceeds the expected value determined in step 406 and is less than one, in step 410, electronic control unit 300 may look up in database 310 the desired extra torque based on the temperature of the engine oil and/or the temperature of the transmission fluid. If the actual value of torque converter slip ratio is greater than one, it may be because the mainshaft is driving the crankshaft as the speed of the motor vehicle decreases. Such a value may not be useful in finding a required torque. Therefore, the system may disregard actual torque converter slip ratio values greater than one.

Alternatively, the required torque may be a function of not only the temperature and whether the actual slip ratio exceeds the expected slip ratio, but also a factor of the difference between the expected slip ratio for the temperature and the actual slip ratio—Δ in the diagram of expected slip ratio according to temperature of the engine oil, transmission fluid, or engine coolant shown in FIG. 5. In that case, the relationship between temperature, actual slip ratio, and required torque could be represented by a table wherein each temperature in the database has associated with it a range of values of slip ratio values greater than the expected value, with each combination of temperature and actual slip ratio having associated with it a required torque.

If, in step 408, the actual slip ratio does not exceed the expected slip value determined in step 406, electronic control unit 300 may find the desired normal output torque based on engine oil temperature from engine oil temperature sensor 106, transmission fluid temperature from transmission fluid temperature 107 sensor, or engine coolant temperature from engine temperature sensor 108 in step 412.

Regardless of whether torque converter slip ratio exceeds expected value, in step 414, electronic control unit 300 may provide a signal to engine 102 for required output torque. Output torque of engine 102 may be adjusted in a variety of ways.

As explained above, electronic control unit 300 may adjust output torque for engine 102 by, for example, providing signals to ignition control unit 330 to adjust ignition timing of ignition system 331; intake air control unit 340 to adjust position of intake air valve 341 and/or to bypass intake air valve 341; adjust operation of fuel injection system 351 through fuel injection system control unit 350; or altering operation of accessories 361 through accessory control unit 360.

A combination of these options may also be employed to increase output torque of engine 102. For example, an increase in fuel injection mass may coincide with an increase in intake air flow in order to achieve the proper stoichiometric ratio of air and fuel. The proper stoichiometric ratio depends on a number of factors, including the type of fuel. Thus, a "flex-fuel" vehicle may require an input of the type of fuel (e.g., gasoline, ethanol, methanol, propane, methane, or hydrogen) in order to properly determine the air/fuel ratio. The proper air/fuel ratio for gasoline may range from 10:1 to 18:1, varying with operating conditions such as heavy load or cold operation. In order to achieve the proper ratio, the fuel injection control unit 350 may vary injection timing, injection pressure, and/or injection open time. Intake air flow may be controlled to achieve the proper air/fuel ratio through intake air control unit 340.

Accessory load control unit 360, as explained above, may control a variety of accessory loads. Accessory load control unit 360 may work in coordination with electronic control unit 300 to prioritize loads so that the least important load under the operating conditions of engine 102. For example, the air conditioner may be running as part of the defrost system and considered less important than maintaining normal operation of the alternator.

One of the problems with a high torque converter slip ratio may be that it may be impossible to get the vehicle moving due to lockup in torque converter 103 and/or transmission 104. Electronic control unit 300 may receive a signal that motor vehicle 100 is not moving, in which case there would be little need for the power steering. Thus, accessory load control unit 360 may decouple the power steering pump or reduce the discharge pressure of the power steering pump.

In the event that electronic control unit 300 determines that the battery of motor vehicle 100 is too low, accessory load control unit 360 may raise the priority of maintaining normal operation of the alternator to ensure that the battery does not become discharged.

Some embodiments may include provisions for limiting unnecessary activation of torque compensation system 101. In some cases, transitory events such as a driver snapping the throttle open or starting engine 102 may cause unusually high slip ratios. These transitory events may result in unnecessary activation of torque compensation system 101. In some embodiments, a timer may start when such unusually high slip ratios are detected to delay or prevent activation of torque compensation system 101. If an unusually high slip ratio persists after the timer expires, torque activation system 101 may be activated. A timer feature may be provided by software or hardware within electronic control unit 300, or may be provided by software or hardware independent of electronic control unit 300.

Figure 6:
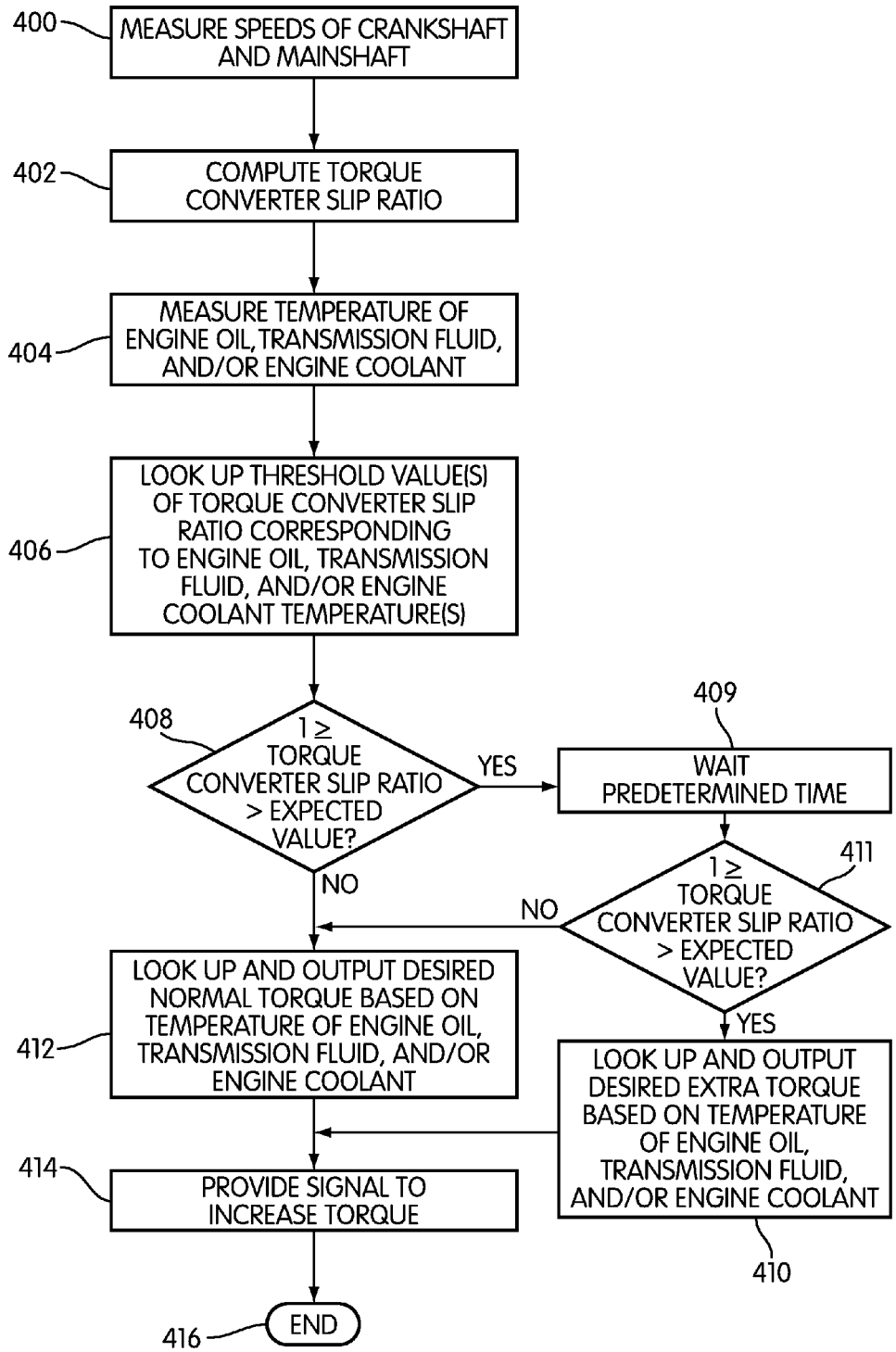
FIG. 6 is an embodiment of a process for limiting torque compensation.

FIG. 6 is another embodiment of a process for controlling torque. In this case, the method includes some steps that are substantially similar to the steps discussed above and shown in FIG. 4. In particular, step 400, step 402, step 404 and step 406 may proceed as before. However, in the current embodiment, the method includes additional steps that help to prevent unnecessary activation of torque compensation system 101. In particular, during step 408, if the torque slip ratio is between 1 and the expected value, electronic control unit 300 may proceed to step 409. Otherwise, electronic control unit 300 may proceed to step 412. During step 409, electronic control unit 300 may wait a predetermined time. In some cases, this step may be accomplished using a timer. After the predetermined time has passed, electronic control unit 300 may then proceed to step 411. During step 411, electronic control unit 300 may determine if the torque slip ratio is still between 1 and the expected value. If so, then the electronic control unit 300 may proceed to step 410 where torque compensation may be provided as discussed above. Otherwise, electronic control unit 300 may proceed to step 412. Following both step 412 and step 410, electronic control unit 300 may proceed to step 414 and eventually to step 416. With this arrangement, the method includes steps of checking that a high slip ratio is not a transitory event since transitory events may not require torque compensation.

In some embodiments, electronic control unit 300 may limit the number of times torque compensation system 101 is activated. The limitation may be a predetermined number of activations of torque compensation system 101 for the life of motor vehicle 100, for a single cycle of starting and shutting down engine 102 of motor vehicle 100, for a given distance motor vehicle 100 is driven, or any other period or combination of periods. The limitations of the number of activations of torque compensation system 101 may be set by software or hardware within electronic control unit 300. Alternatively, the limitations of the number of activations of torque compensation system 101 may be set by software or hardware external to electronic control unit 300.

Figure 7:
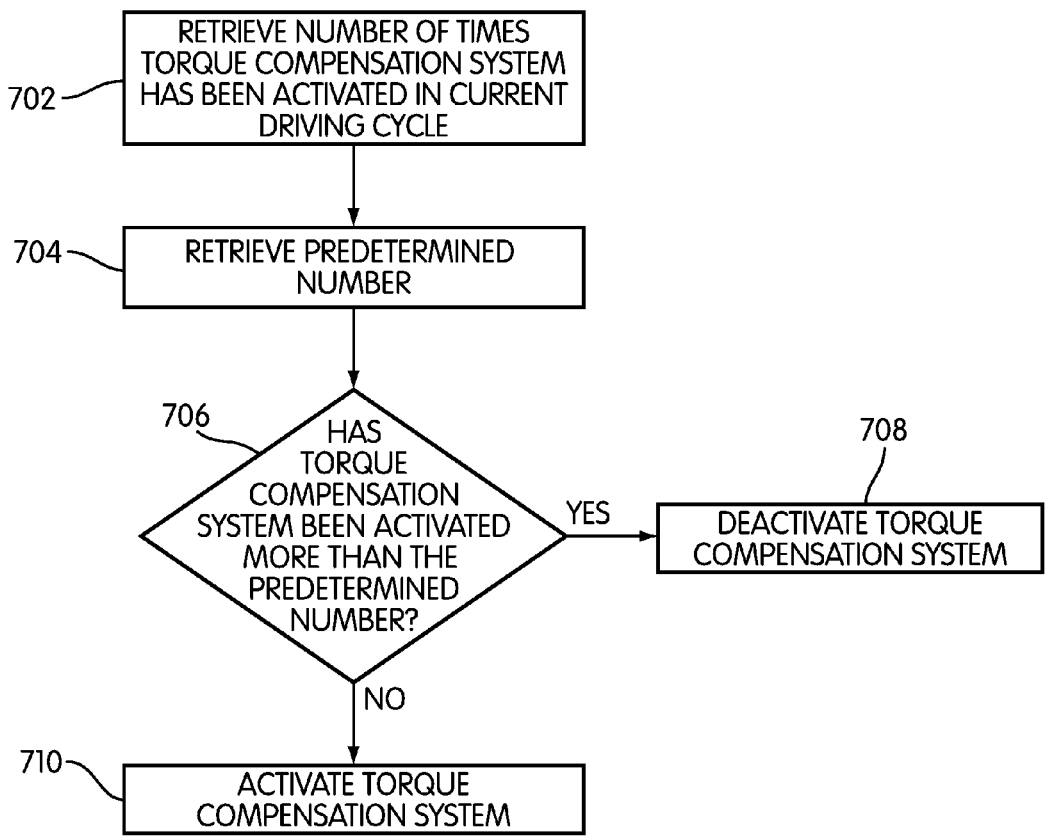
FIG. 7 is an embodiment of a process for limiting torque compensation.

FIG. 7 illustrates an embodiment of a process for determining when to use a torque compensation system. In some cases, this process may be used prior to starting the processes discussed above and shown in FIGS. 4 and 6. Referring to FIG. 7, electronic control unit 300 may retrieve the number of times that torque compensation system 101 has been activated in the current driving cycle. Next, during step 704, electronic control unit 300 may retrieve a predetermined number. This number may be determined by a manufacturer and stored in memory. Following this, during step 706, electronic control unit 706 may determine if torque compensation system 101 has been activated more than the predetermined number of times. If so, electronic control unit 300 may proceed to step 708 to deactivate, or otherwise prevent torque compensation system 101 from running. Otherwise, if during step 706 electronic control unit 300 determines that torque compensation system 101 has been activated less than the predetermined number of times, electronic control unit 300 may proceed to step 710. During step 710, torque compensation system 101 may be activated. In other words, electronic control unit 300 may start a process of calculating the torque slip ratio and applying extra torque when necessary as discussed above and illustrated in FIGS. 4 and 6.

Another possible source of unnecessary activation of torque compensation system 101 may be noise or unusual signals. In some embodiments, the signals from crankshaft speed sensor 111, mainshaft speed sensor 121, and/or output shaft speed sensor 131 may be filtered to increase the signal to noise ratio. The signal filtering may reduce such unnecessary activation by reducing the incidence of calculation of erroneous slip ratios.

Rather than directly measuring temperature using engine oil temperature sensor 106, transmission fluid temperature sensor 107, and or engine coolant temperature 108, input from one or more of sensors 106-108 may be replaced by input from a system for simulating engine oil temperature or transmission fluid temperature.

Figure 8:
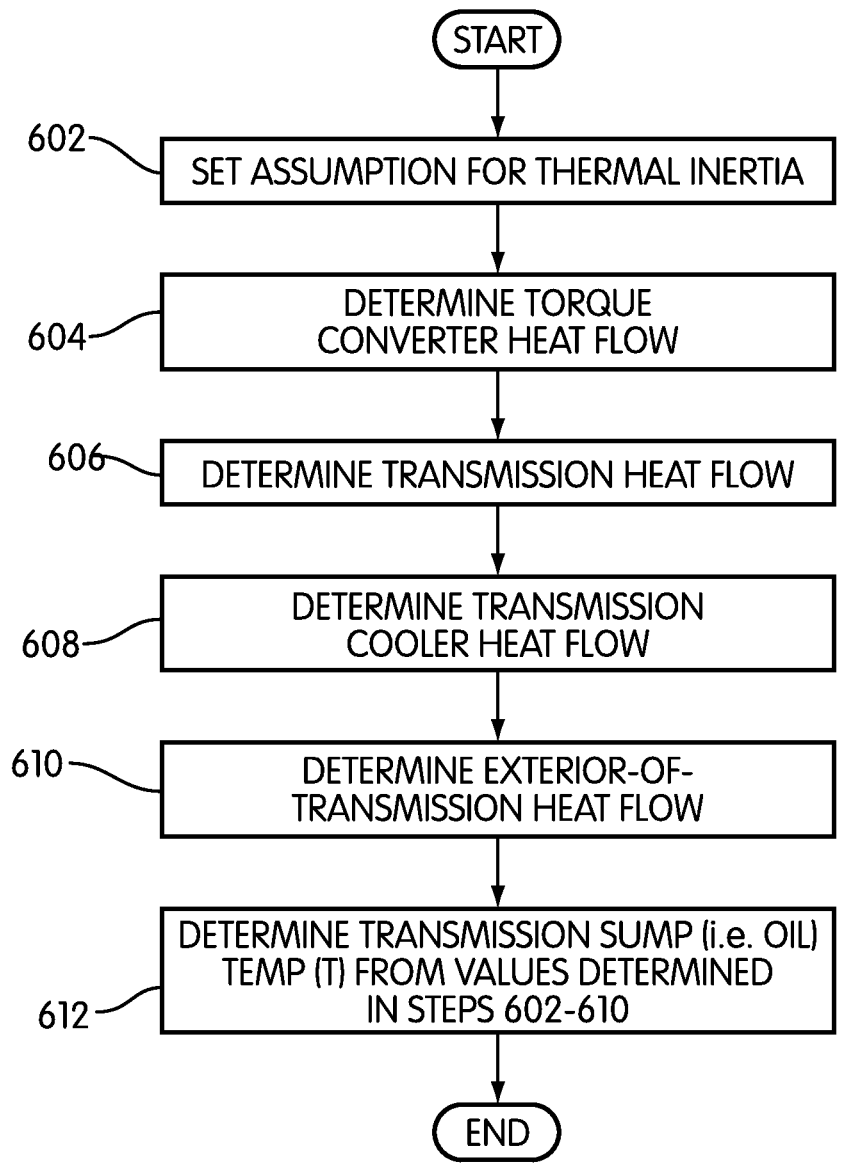
FIG. 8 is an embodiment of a method of estimating transmission fluid temperature using engine and vehicle parameters.

FIG. 8 shows a simplified flow chart illustrating a method of estimating transmission sump temperature based on heat added and lost during operation of transmission 104 of motor vehicle 100. The transmission sump temperature $T_O$ may first be determined by assuming a single thermal inertia $M_{TH}$ for the components of an automatic transmission system in step 602.

Torque converter heat flow $q_{TC}$ may be determined in step 604, and may be based on known characteristics of torque converter 103. Step 606 may involve determining transmission heat flow $q_T$, primarily due to operation of a transmission fluid pump. The torque of the transmission fluid pump may be largely proportional to line pressure and to gear box parasitic drag. Coefficients used in the calculation of transmission heat flow may depend on the gear being used. For simplicity, heat added during transmission shifts may be omitted to simplify the determination of the transmission sump temperature.

FIG. 9 shows an equation that may be used to determine heat flow in a transmission cooler along with definitions of the variables.

In step 610, exterior of transmission heat flow $q_x$ may be determined. This heat flow may be estimated to be the difference between the transmission sump temperature and ambient air temperature, multiplied by a function of vehicle speed. The function may be determined by vehicle testing with the transmission cooler bypassed.

FIG. 10 shows a formula that may be used to predict transmission 104 sump temperature in step 612. The calculation using this formula may be used after determination of the heat flows of steps 602-610.

A similar method to that shown in FIG. 8 may be used to determine engine oil temperature.

While various embodiments of the invention have been described, the description is intended to be exemplary, rather than limiting and it will be apparent to those of ordinary skill in the art that many more embodiments and implementations are possible that are within the scope of the invention.

Accordingly, the invention is not to be restricted except in light of the attached claims and their equivalents. Also, various modifications and changes may be made within the scope of the attached claims.

What is claimed is:

1. A system for adjusting output torque of an engine for a motor vehicle including a torque compensation system, comprising:
    an electronic control unit;
    a first sensor for detecting a rotational speed of a first shaft in a drive train of the motor vehicle, the first shaft being an input shaft;
    a second sensor for detecting a rotational speed of a second shaft in the drive train of the motor vehicle, the second shaft of the motor vehicle being an output shaft hydraulically coupled to the first shaft; and
    a temperature sensor for determining a vehicle fluid temperature;
    wherein the electronic control unit is configured to calculate an actual slip ratio based on a measured speed from the first sensor and a measured speed from the second sensor;
    wherein the electronic control unit is further configured to activate the torque compensation system by:
        determining an expected slip ratio based on a measured vehicle fluid temperature from the temperature sensor, wherein the expected slip ratio is determined based on a correlation between the vehicle fluid temperature and the expected slip ratio stored in a database in communication with the electronic control unit;
        determining whether the actual slip ratio between the first shaft and the second shaft exceeds the expected slip ratio corresponding to the measured vehicle fluid temperature; and
        adjusting the output torque based on a result of the determining whether the actual slip ratio exceeds the expected slip ratio corresponding to the measured vehicle fluid temperature;
    wherein the electronic control unit is further configured to retrieve a number of times the torque compensation system has been activated in a current driving cycle; and
    wherein the electronic control unit is configured to deactivate the torque compensation system if the number of times the torque compensation system has been activated in the current driving cycle exceeds a predetermined number of activations.

2. The system according to claim 1, wherein the electronic control unit is further configured to provide a signal to the engine to generate a normal torque output upon determining that the actual slip ratio does not exceed the expected slip ratio, the normal torque output being determined as a function of the measured vehicle fluid temperature; and
    wherein the electronic control unit is further configured to provide a signal to the engine to generate an increased torque output upon determining that the actual slip ratio exceeds the expected slip ratio; the increased torque output being greater than the normal torque output and wherein the increased torque output is determined as a function of the measured vehicle fluid temperature.

3. The system according to claim 2, wherein the signal to the engine to generate the increased torque output includes adjusting ignition timing.

4. The system according to claim 2, wherein the signal to the engine to generate the increased torque output includes adjusting engine intake air supply.

5. The system according to claim 2, wherein the signal to the engine to generate the increased torque output includes adjusting fuel injection.

6. The system according to claim 5, wherein the fuel injection is adjusted by varying one or more of injection timing, injection pressure, and injection open time.

7. The system according to claim 2, wherein the signal to the engine to generate the increased torque output includes decreasing accessory load.

8. The system according to claim 7, wherein the accessory load is decreased by one or more of decreasing an alternator field, decoupling an alternator, decoupling a power steering pump, and reducing a power steering pump pressure.

9. The system according to claim 1, wherein the predetermined number of activations is set for one or more of: a life of the motor vehicle, a single cycle of starting and shutting down the engine of the motor vehicle, and a given distance that the motor vehicle is driven.

10. The system according to claim 1, further comprising a signal filter associated with at least one of the first sensor and the second sensor.

11. A method for adjusting output torque of an engine for a motor vehicle including a torque compensation system in communication with an electronic control unit, comprising the steps of:
    detecting a rotational speed of a first shaft in a drive train of the motor vehicle using a first sensor, the first shaft being an input shaft;
    detecting a rotational speed of a second shaft in the drive train of the motor using a second sensor, the second shaft of the motor vehicle being an output shaft hydraulically coupled to the first shaft;
    determining a vehicle fluid temperature using a temperature sensor; and
    wherein the electronic control unit further performs the steps of:
        activating the torque compensation system by:
            calculating an actual slip ratio based on a measured speed from the first sensor and a measured speed from the second sensor;
            determining an expected slip ratio based on a measured vehicle fluid temperature from the temperature sensor, wherein the expected slip ratio is determined based on a correlation between the vehicle fluid temperature and the expected slip ratio stored in a database in communication with the electronic control unit;
            determining whether the actual slip ratio between the first shaft and the second shaft exceeds the expected slip ratio corresponding to the measured vehicle fluid temperature;
            adjusting the output torque based on a result of the determining whether the actual slip ratio exceeds the expected slip ratio corresponding to the measured vehicle fluid temperature;
    wherein the electronic control unit further performs the steps of:
    retrieving a number of times the torque compensation system has been activated; and
    deactivating the torque compensation system if the number of times the torque compensation system has been activated exceeds a predetermined number of activations.

12. The method according to claim 11, wherein the step of retrieving a number of times the torque compensation system has been activated further comprises retrieving a number of times the torque compensation system has been activated in a current driving cycle; and wherein the step of deactivating the torque compensation system further comprises deactivating the torque compensation system if the number of times the torque compensation system has been activated in the current driving cycle exceeds the predetermined number of activations.

13. The method according to claim 11, further comprising setting the predetermined number of activations using the electronic control system.

14. The method according to claim 13, wherein the step of setting the predetermined number of activations comprises setting the predetermined number for one or more of: a life of the motor vehicle, a single cycle of starting and shutting down the engine of the motor vehicle, and a given distance that the motor vehicle is driven.

15. The method according to claim 11, wherein upon determining by the electronic control unit that the number of times the torque compensation system has been activated does not exceed the predetermined number of activations, the electronic control unit activating the torque compensation system.

16. The method according to claim 15, wherein the step of activating the torque compensation system further comprises varying operation of the engine of the motor vehicle using the electronic control unit to maintain a predetermined output torque of the engine of the motor vehicle.

17. The method according to claim 16, further comprising:

providing a signal to the engine from the electronic control unit to generate a normal torque output to the first shaft as an input torque upon determining that the actual slip ratio does not exceed the expected slip ratio, the normal torque output being determined as a function of the vehicle fluid temperature.

18. The method according to claim 17, further comprising:

providing a signal to the engine from the electronic control unit to generate an increased torque output to the first shaft as the input torque upon determining that the actual slip ratio is above the expected slip ratio, wherein the increased torque output is greater than the normal torque output and wherein the increased torque output is determined as a function of the vehicle fluid temperature.

19. The method according to claim 18, wherein the signal to the engine to generate the increased torque output includes at least one of adjusting ignition timing, adjusting engine intake air supply, and adjusting fuel injection.

20. The method according to claim 11, further comprising filtering a signal associated with at least one of the first sensor and the second sensor to increase a signal to noise ratio.

* * * * *